(12) United States Patent
Mei et al.

(10) Patent No.: US 7,754,370 B2
(45) Date of Patent: Jul. 13, 2010

(54) FUEL CELL CATALYST MATERIAL, FUEL CELL ELECTRODE, MEMBRANE-ELECTRODE ASSEMBLY, FUEL CELL, FUEL CELL CATALYST MATERIAL MANUFACTURING METHOD, AND FUEL CELL ELECTRODE MANUFACTURING METHOD

(75) Inventors: Wu Mei, Yokohama (JP); Yoshihiko Nakano, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 898 days.

(21) Appl. No.: 10/643,974

(22) Filed: Aug. 20, 2003

(65) Prior Publication Data

US 2004/0121219 A1 Jun. 24, 2004

(30) Foreign Application Priority Data

Aug. 21, 2002 (JP) ............................. 2002-241061

(51) Int. Cl.
*H01M 4/00* (2006.01)

(52) U.S. Cl. ............................. 429/40; 502/34; 502/54; 502/102

(58) Field of Classification Search .................. 429/40; 502/200, 313, 315–317, 326, 330, 337–339
See application file for complete search history.

(56) References Cited

U.S. PATENT DOCUMENTS

| | | | |
|---|---|---|---|
| 4,794,054 A | * | 12/1988 | Ito et al. ....................... 429/44 |
| 2002/0015878 A1 | * | 2/2002 | Tsumura et al. ................ 429/42 |
| 2004/0121219 A1 | | 6/2004 | Mei et al. |

FOREIGN PATENT DOCUMENTS

| | | |
|---|---|---|
| JP | 57-7260 | 1/1982 |
| JP | 6-56554 | 3/1994 |
| JP | 10-189012 | 7/1998 |
| JP | 2001-110431 | 4/2001 |
| JP | 2002-226926 | 8/2002 |

OTHER PUBLICATIONS

U.S. Appl. No. 11/370,852, filed Mar. 9, 2006, Mei et al.

* cited by examiner

*Primary Examiner*—Patrick Ryan
*Assistant Examiner*—Cynthia Lee
(74) *Attorney, Agent, or Firm*—Oblon, Spivak, McClelland, Maier & Neustadt, L.L.P.

(57) ABSTRACT

This invention provides a fuel cell catalyst material containing catalyst particles having a composition substantially represented by $$AT_xN_u \qquad (1)$$

wherein A contains Pt or Pt and at least one noble metal element selected from the group consisting of Ru, Pd, Au, and Ag, T contains at least one element selected from the group consisting of Fe, Co, Ni, Sn, Mn, Cr, V, Ti, Mo, Nb, Zr, W, Ta, and Hf, and atomic ratios $\underline{x}$ and $\underline{u}$ fall within the ranges $0 \leqq x \leqq 4$ and $0.005 \leqq u \leqq 1$, respectively.

3 Claims, 1 Drawing Sheet

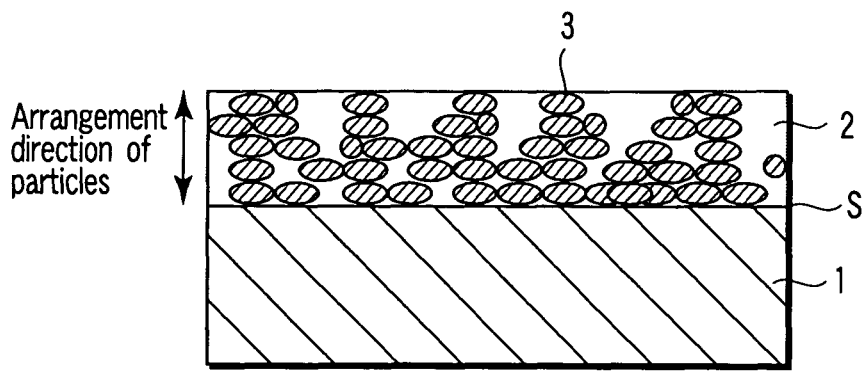
F I G. 1
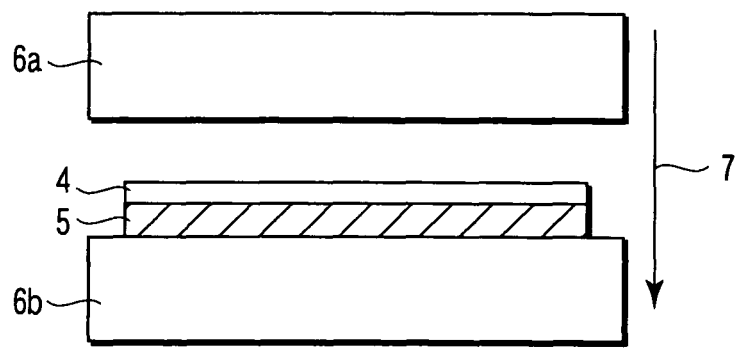
F I G. 2
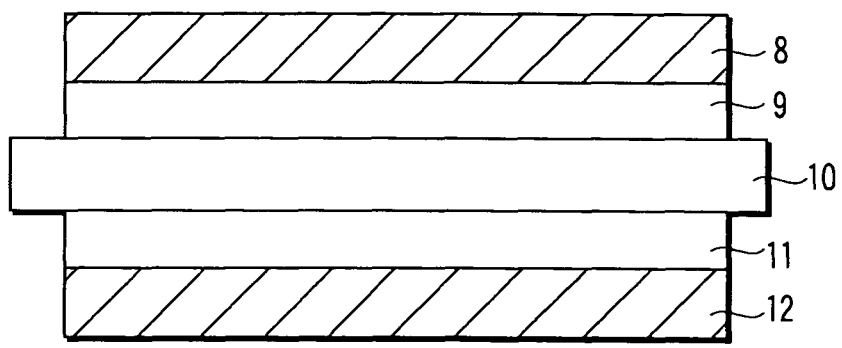
F I G. 3

FUEL CELL CATALYST MATERIAL, FUEL CELL ELECTRODE, MEMBRANE-ELECTRODE ASSEMBLY, FUEL CELL, FUEL CELL CATALYST MATERIAL MANUFACTURING METHOD, AND FUEL CELL ELECTRODE MANUFACTURING METHOD

CROSS-REFERENCE TO RELATED APPLICATIONS

This application is based upon and claims the benefit of priority from the prior Japanese Patent Application No. 2002-241061, filed Aug. 21, 2002, the entire contents of which are incorporated herein by reference.

BACKGROUND OF THE INVENTION

1. Field of the Invention

The present invention relates to a fuel cell catalyst material, fuel cell electrode, membrane-electrode assembly, fuel cell, fuel cell catalyst material manufacturing method, and fuel cell electrode manufacturing method.

2. Description of the Related Art

A fuel cell electrochemically oxidizes fuel such as hydrogen or methanol in the cell, thereby directly converting the chemical energy of the fuel into electrical energy and extracting this electrical energy. Since neither $NO_x$ nor $SO_x$ is produced by combustion of fuel, unlike a thermal power station, a fuel cell has attracted attention as a clean electrical energy supply source. In particular, a polymer electrolyte fuel cell can be made smaller and lighter than other fuel cells and hence has been developed as a spacecraft power supply. Recently, polymer electrolyte fuel cells are also extensively studied as power supplies for automobiles and mobile apparatuses. However, these conventional fuel cells have not been widely used yet because the performance deteriorates at temperatures lower than 100° C.

The cell reaction of a fuel cell is a redox reaction occurring between an anode electrode and cathode electrode. Although various efforts have been made so far, e.g., a catalyst material is alloyed (particularly a transition metal is substituted), and the activity is improved by changing a conductive carrier, no catalyst material having sufficiently high activity and chemical stability has been found yet. So, Pt—Ru and Pt are still most often used as an anode catalyst material and cathode catalyst material, respectively. To further improve the performance of fuel cells, it is necessary to develop a highly active and highly stable catalyst which smoothly causes a redox reaction.

BRIEF SUMMARY OF THE INVENTION

It is an object of the present invention to provide a fuel cell catalyst material capable of improving the output performance of a fuel cell, a fuel cell electrode, a membrane-electrode assembly, a fuel cell, a fuel cell catalyst material manufacturing method, and a fuel cell electrode manufacturing method.

According to a first aspect of the present invention, there is provided a fuel cell catalyst material containing catalyst particles having a composition substantially represented by

wherein A contains Pt or Pt and at least one noble metal element selected from the group consisting of Ru, Pd, Au, and Ag; T contains at least one element selected from the group consisting of Fe, Co, Ni, Sn, Mn, Cr, V, Ti, Mo, Nb, Zr, W, Ta, and Hf; and atomic ratios $\underline{x}$ and $\underline{u}$ fall within ranges $0 \leq x \leq 4$ and $0.005 \leq u \leq 1$, respectively.

According to a second aspect of the present invention, there is provided a membrane-electrode assembly comprising an anode electrode, a cathode electrode, and an electrolyte layer provided between the anode electrode and cathode electrode, wherein at least one of the anode electrode and cathode electrode contains catalyst particles substantially represented by formula (1) described above.

According to a third aspect of the present invention, there is provided a fuel cell comprising an anode electrode, a cathode electrode, and an electrolyte layer provided between the anode electrode and cathode electrode, wherein at least one of the anode electrode and cathode electrode contains catalyst particles substantially represented by formula (1) described above.

According to a fourth aspect of the present invention, there is provided a fuel cell catalyst material manufacturing method comprising nitriding a Pt-containing catalyst precursor at a temperature of 200° C. to 1,000° C. for 0.05 to 100 hrs in a gas atmosphere containing $NH_3$ with a partial pressure of 0.05 atm or more.

According to a fifth aspect of the present invention, there is provided a fuel cell electrode comprising a catalyst layer which contains a catalyst material particles containing a ferromagnetic catalyst having a composition represented by formula (2) below, and in which at least one part of the catalyst material particles are arranged along one direction:

wherein R contains at least one noble metal element selected from the group consisting of Pt, Ru, Pd, Au, and Ag; T1 contains at least one element selected from the group consisting of Fe and Co; M1 contains at least one element selected from the group consisting of Mo, Sn, Ni, W, Ti, Zr, Nb, V, Ta, Hf, Mn, and Cr; A1 contains at least one element selected from the group consisting of N, C, B, and P; and atomic ratios $\underline{u}$, $\underline{v}$, and $\underline{w}$ fall within ranges $0.2 \leq u \leq 4$, $0 \leq v \leq 1$, and $0 \leq w \leq 1$, respectively.

According to a sixth aspect of the present invention, there is provided a membrane-electrode assembly comprising an anode electrode including a collector and an anode catalyst layer provided on the collector, a cathode electrode, and an electrolyte layer provided between the anode electrode and cathode electrode, wherein the anode catalyst layer contains a catalyst material particles containing a ferromagnetic catalyst having a composition represented by formula (2) described above, at least one part of the catalyst material particles stack along a thickness direction of the anode catalyst layer, and in the anode catalyst layer, a content of the catalyst material particles on a surface facing the collector is larger than that of the catalyst material particles on a surface facing the electrolyte layer.

According to a seventh aspect of the present invention, there is provided a membrane-electrode assembly comprising an anode electrode, a cathode electrode including a collector and a cathode catalyst layer provided on the collector, and an electrolyte layer provided between the anode electrode and cathode electrode, wherein the cathode catalyst layer contains a catalyst material particles containing a ferromagnetic catalyst having a composition represented by formula (2) described above, at least one part of the catalyst material particles stack along a thickness direction of the cathode catalyst layer, and in the cathode catalyst layer, a content of the catalyst material particles on a surface facing the electrolyte layer is larger than that of the catalyst material particles on a surface facing the collector.

According to an eighth aspect of the present invention, there is provided a fuel cell electrode manufacturing method comprising:

forming an undried catalyst layer on a support by coating the support with a slurry containing catalyst material particles, a proton conductive material and an organic solvent, the catalyst material particles containing ferromagnetic catalyst particles; and drying the catalyst layer under a magnetic field of not less than 0.1 tesla.

According to a ninth aspect of the present invention, there is provided a fuel cell electrode manufacturing apparatus which is used in the manufacture of a fuel cell electrode according to the present invention, and which comprises a magnetic field generating unit which includes at least one of an electromagnet and a permanent magnet.

BRIEF DESCRIPTION OF THE SEVERAL VIEWS OF THE DRAWING

FIG. 1 is a schematic view showing an example of a fuel cell electrode according to the present invention;

FIG. 2 is a schematic view showing an example of the magnetic field treatment applying step of a fuel cell electrode manufacturing method according to the present invention; and FIG. 3 is a sectional view showing a membrane-electrode assembly (MEA) used in a fuel cell of Example 1.

DETAILED DESCRIPTION OF THE INVENTION

The present invention has been made by making extensive studies to improve the activity and stability of a catalyst material, in order to achieve the above object.

That is, the first invention is a catalyst material.

A fuel cell catalyst material according to the present invention is obtained by nitriding ultrafine platinum-based particles. When nitrogen is added to an element or compound, a new property is given to the element or compound to improve its original material performance. Since this phenomenon is often observed, research and development of nitrides such as AlN, GaN, and SmFeN are being extensively made. Pt can form various alloys and compounds with other elements. However, since Pt is extremely stable against nitrogen, only a bulk alloy nitride containing a small amount of Pt, such as $Fe_3PtN$, can be obtained. On the other hand, a nanosize material increases the ratio of atoms on the material surface, so the characteristics of the surface atoms have influence on the performance of the whole material. Accordingly, the characteristics of a material may be changed by downsizing the material to nanosize. The present inventors have found that a highly active and highly stable fuel cell catalyst can be obtained by adding a nitrogen element to ultrafine platinum-based particles having a specific composition, and have completed the present invention.

The second embodiment is a fuel cell catalyst material manufacturing method comprising nitriding a catalyst precursor containing platinum-containing particles at a temperature of 200° C. to 1,000° C. for 0.05 to 100 hrs in a gas atmosphere containing $NH_3$ with a partial pressure of 0.05 atm or more.

The present inventors made extensive studies, and have found that when a catalyst material containing platinum-containing particles is to be nitrided, the activity of N atoms is higher in an $NH_3$ atmosphere than in an $N_2$ atmosphere, so the platinum-containing particles can be nitrided by the combined effect of this highly active $NH_3$ atmosphere and downsizing of the platinum-containing particles to nanosize.

The third embodiment is a fuel cell electrode having a catalyst layer in which a catalyst material containing fine ferromagnetic catalyst particles is arranged in one direction.

Methods of using a magnetic material to improve the catalyst layer structure have been disclosed before. For example, Jpn. Pat. Appln. KOKAI Publication Nos. 6-56554 and 10-189012 disclose a method in which a magnetic field is exerted on an electrode containing a magnetic material as a pore forming agent to align this magnetic material in a predetermined direction, and pores arranged in a predetermined direction are formed in the electrode by removing the magnetic material by calcination or boiling in dilute sulfuric acid, thereby improving the gas permeability of the electrode. Also, Jpn. Pat. Appln. KOKAI Publication No. 2001-110431 describes that the radical activation of fuel is promoted by a ferromagnetic dielectric substance. The methods described in these references have almost no effect on the thickness of a catalyst layer, the distribution of catalyst particles in the catalyst layer, the conduction path of electrons, and the conduction path of protons. Therefore, a fuel cell having high output performance cannot be obtained. The present inventors have found that, by using a ferromagnetic platinum-based catalyst material containing Fe or Co and applying magnetic field treatment to the ferromagnetic catalyst particles, catalyst material particles containing ferromagnetic catalyst particles can be arranged along one direction, thereby improving the catalyst layer structure and cell performance.

First, the fuel cell catalyst material according to the first invention will be described below.

(Element A)

An element A is Pt or made of Pt and at least one noble metal element selected from the group consisting of Ru, Pd, Au, and Ag.

Pt can improve the activity and chemical stability of the catalyst. If the atomic ratio of Pt is less than 1, the chemical stability of the catalyst material is significantly lowered. Each of Ru, Pd, Au, and Ag has performance similar to those of Pt and hence can help improve the activity and chemical stability of the catalyst. However, if the content of these noble metal elements in the element A exceeds 60 at %, the activity or chemical stability of the catalyst material may be lowered. Therefore, the content of at least one noble metal element in the element A is preferably 60 at % or less, and more preferably, 50 at % or less. Especially when the catalyst material is to be used as an anode catalyst material, the element A is desirably made up of 50 at % of Pt and 50 at % of Ru.

(Element T)

An element T is at least one element selected from the group consisting of Fe, Co, Ni, Sn, Mn, Cr, V, Ti, Mo, Nb, Zr, W, Ta, and Hf.

The element T can increase the activity of the catalyst, and can be nitrided more easily than Pt. When the element T is contained in the platinum-containing catalyst particles, nitriding of the catalyst particles can be promoted. When an atomic ratio $\underline{x}$ is 0.2 or more, a satisfactory nitriding promoting effect can be obtained. However, if the atomic ratio $\underline{x}$ of the element T exceeds 4, the chemical stability of the catalyst material is significantly lowered. Also, when an element containing at least one of Fe, Co, and Ni is used as the element T, a ferromagnetic catalyst material can be obtained. In this case, the atomic ratio x of the element T is preferably 0.25 (inclusive) to 4 (inclusive). In particular, Fe, Co, Mo, W, Cr, and Ag can well increase the catalyst activity of a noble metal such as Pt, and can promote nitriding.

(Element N)

Nitrogen (N) is mainly present in the interstitial position of a material, but sometimes segregates on the surface of fine particles. Compared to a material not containing nitrogen (N), the crystal structure and surface electron state of a fine particle can be changed. Therefore, nitrogen has effects of improving the activity and chemical stability of the catalyst material. In particular, the chemical stability of an alloy containing a large amount of the T element can be greatly improved by the addition of nitrogen. Since the T element is much more advantageous than Pt in terms of material cost, a catalyst material containing nitrogen, the T element, and platinum can reduce the cost of the fuel cell. By setting an atomic ratio u of N at 0.005 to 1, both the activity and stability of the catalyst material can be improved. Accordingly, a high-output, high-durability fuel cell can be realized. Also, 30 at % or less of N can be substituted by at least one element selected from the group consisting of C, B, H, S, P, and O. By this partial substitution with these elements, the activity or stability of the catalyst material further improves in some cases.

Although the average diameter of the catalyst particles represented by formula (1) presented earlier is not particularly limited, this average diameter can be set at 0.5 to 500 nm for the reasons explained below. If the average diameter is less than 0.5 nm, surface oxidation, flocculation, or sintering of the catalyst particles intensely occurs. Since this decreases the activation site density on the catalyst particle surface, the activity or stability of the catalyst material may be lowered. If the average diameter exceeds 500 nm, the specific surface area of the catalyst particle is reduced. This lowers the activation site density and makes it difficult to obtain high activity. Also, if nitriding is so performed as to make the average diameter larger than 500 nm, it becomes difficult to add nitrogen particularly to platinum rich particles. The average diameter is more preferably 0.5 to 50 nm, and most preferably, 1 to 10 nm.

The crystal structure of the catalyst particles represented by formula (1) can be any of amorphous, quasi-crystal, and crystal. The crystal structure can also be a mixture containing at least two of amorphous, quasi-crystal, and crystal.

The catalyst particles represented by formula (1) can be directly applied or carried on the surface of another material. It is particularly desirable to carry the catalyst particles on fine conductive particles. In this case, flocculation and sintering between the catalyst particles are suppressed, so the durability of the catalyst particles can be improved. At the same time, the activation can be improved by the combined effect with the activating action of the carrier. Examples of the carrier are carbon-based powders such as carbon black and carbon nanofiber. However, other materials having high conductivity can also be used.

The content of the catalyst particles in the catalyst material is preferably 10 wt % or more.

The fuel cell catalyst material manufacturing method according to the second embodiment will be explained below.

First, a catalyst precursor containing ultrafine Pt-containing particles is formed. A method of forming the ultrafine particles can be any of a solid phase reaction method, solid phase-vapor phase reaction method, liquid phase method, and vapor phase method. The liquid phase method can be any of an impregnation method, precipitation method, coprecipitation method, colloid method, and ion exchange method. Of these methods, the coprecipitation method is particularly favored. Also, the element T is preferably further added to the ultrafine particles because nitriding (to be described later) is accelerated.

A method of forming the catalyst precursor containing the ultrafine particles which contain Pt and the element T will be described below. First, an active component solution containing the element T is mixed with Pt. When fine catalyst particles are to be carried on a carrier such as carbon powders, this carrier is also added to the active component solutions. A precipitating medium is added to the obtained solution mixture to produce a coprecipitate. Subsequently, this precipitate is dried and calcined to obtain a catalyst precursor. To produce a highly uniform coprecipitate by coprecipitation, it is desirable to control the concentrations, pH, temperatures, and addition order of the solutions, the type and addition method of the precipitating medium, and the like. To obtain a catalyst precursor having an appropriate particle size and particle size distribution, it is desirable to control the atmosphere, temperature, time, and the like of calcination.

The conditions of nitriding performed for this catalyst precursor will be explained below.

Nitriding is performed at a temperature of 200° C. to 1,000° C. for 0.05 to 100 hrs in a gas atmosphere containing $NH_3$ with a partial pressure of 0.05 atm or more. Nitrogen cannot be introduced to platinum-containing particles any longer if the nitriding temperature is less than 200° C., the nitriding time is less than 0.05 hrs, or the $NH_3$ partial pressure in the gas atmosphere is less than 0.05 atm. On the other hand, if the nitriding temperature is higher than 1,000° C. or the nitriding time is longer than 100 hrs, flocculation of the fine particles or element diffusion in a thin film intensely occurs, so no high-activity catalyst material can be obtained. Although preferred processing conditions depend on the material composition and state, the conditions are desirably 400 to 800° C., 3 to 24 hrs, and a gas atmosphere containing $NH_3$ with a partial pressure of 0.1 atm or more. If a high-partial-pressure $NH_3$ atmosphere is used, a platinum nitride-based nano-material can be obtained within a shorter time. However, annealing is necessary to obtain a uniform material, and this may complicate the manufacturing process of the catalyst material. Therefore, the upper limit of the $NH_3$ partial pressure is desirably 20 atm. Also, in addition to $NH_3$, another type of gas is preferably present in the atmosphere gas. Examples of the other type of gas are hydrogen ($H_2$) gas and oxygen ($O_2$) gas. The atmosphere gas may also be fluidized by the $NH_3$ partial pressure.

In the manufacturing method of the present invention, the composition of the Pt-containing nanosize material before nitriding is not particularly limited. For example, the material before nitriding can be an oxide containing Pt and the element T. In particular, nitriding is preferably performed while the fine particles containing Pt are carried on a carrier such as carbon powders. This suppresses the growth of the Pt-containing particles and accelerates the introduction of nitrogen. Consequently, it is possible to obtain a catalyst material containing the catalyst particles represented by formula (1) and having an average diameter of 0.5 to 500 nm.

An electrode composition containing the fuel cell catalyst material according to the first embodiment will be described below. This electrode composition contains a proton conductive material and the fuel cell catalyst material according to the present invention. A conductive substance such as graphite or a polymer such as PTFE may also be added, if the addition is effective for electrode formation.

The proton conductive material can be any substance which can conduct protons. Practical examples are fluorine-based resins (e.g., Nafion, Flemion, and Aciprex) having a sulfonic acid group, and inorganic materials such as tungstic acid and phosphotungstic acid. However, the proton conductive material is not limited to these materials. The mixing amount of the proton conductive material is preferably 1 to 1,000 parts by weight with respect to 100 parts by weight of the catalyst. The mixing amount of the proton conductive material is more preferably 10 to 200 parts by weight.

A wet method and dry method can be used to form an electrode using this electrode composition. These methods will be described below.

The wet method will be described first. In this wet method, a slurry containing the above composition must be formed. That is, water is added to the above-mentioned catalyst, and the resultant material is well stirred. A proton conductive solution is added, and an organic solvent is also added. After the resultant material is well stirred, a conductive substance is added and dispersed to form a slurry. The organic solvent used is a single solvent or a mixture of two or more solvents. In the dispersion, a slurry as a dispersion can be formed by using a generally used dispersing machine (e.g., a ball mill, sand mill, bead mill, paint shaker, or nanomizer). A water-repellent collector (carbon paper or carbon cloth) is coated with the formed dispersion (slurry) by using various methods, and the resultant structure is dried to obtain an electrode having the above electrode composition. The solvent amount in the slurry is so adjusted that the solid component is 5 to 60%. The carbon paper or carbon cloth is given water repellency to such an extent that this carbon paper or carbon cloth can be coated with the slurry.

An electrode formation method using the dry method will be described below.

First, a composition containing the catalyst material, the conductive substance, a binder resin, and a pore forming agent will be explained.

The catalyst material and conductive substance described above are used. The pore forming agent can be any substance which dissolves in an acid, alkali, or water. Practical examples are lithium carbonate, ammonium carbonate, lithium fluoride, polyvinyl alcohol, polyethylene oxide, phosphotungstic acid and its salts, phosphomolybdic acid and its salts, and ammonium chloride. However, the pore forming agent is not limited to these examples.

The composition ratio of the pore forming agent in the composition is preferably 1 to 50 wt %, and more preferably, 5 to 30 wt %.

The binder resin can be any thermoplastic resin such as polyolefin, polyester, fluorine resin, polyketone, polyether, or polysulfone. The amount of the binder resin is preferably 10 to 200 parts by weight with respect to 100 parts by weight as the total amount of the catalyst and conductive substance.

The binder resin and pore forming agent are added to the catalyst described above. The resultant material is kneaded by a roll or the like and uniformly dispersed to obtain a uniformly dispersed composition. Heat can also be added during the kneading.

The composition is adhered to a mesh-like or porous collector and formed into a sheet. Alternatively, the composition is formed into a sheet by a roll or the like and then adhered to a collector.

The catalyst composition containing the pore forming agent is dipped in an aqueous acidic or alkaline solution to dissolve the pore forming agent. The resultant material is washed well with ion exchange water, and dipped in a solution in which the proton conductive material is dissolved, thereby impregnating the catalyst layer with the proton conductive material. In this manner, an electrode is obtained.

A cathode electrode and anode electrode are formed by one of the above two methods, and an electrolyte layer such as a proton conductive solid film is placed between the cathode electrode and anode electrode. The resultant structure is bonded by thermocompression bonding by using a roll or press, thereby obtaining a membrane-electrode assembly.

The conditions of thermocompression bonding for obtaining the membrane-electrode assembly are a temperature of 100° C. (inclusive) to 180° C. (inclusive), a pressure of 10 to 200 Kg/cm², and a time of 1 min (inclusive) to 30 min (inclusive).

The fuel cell electrode according to the third embodiment will be described below.

The fuel cell electrode according to the present invention comprises a catalyst layer in which at least a portion of a catalyst material particles containing ferromagnetic catalyst having a composition represented by formula (2) below is arranged along one direction.

$$RT1_u M1_v A1_w \quad (2)$$

wherein R is at least one noble metal element selected from the group consisting of Pt, Ru, Pd, Au, and Ag; T1 is at least one element selected from the group consisting of Fe and Co; M1 is at least one element selected from the group consisting of Mo, Sn, Ni, W, Ti, Zr, Nb, V, Ta, Hf, Mn, and Cr; A1 is at least one element selected from the group consisting of N, C, B, and P; and atomic ratios $\underline{u}$, $\underline{v}$, and $\underline{w}$ fall within the ranges $0.2 \leq u \leq 4$, $0 \leq v \leq 1$, and $0 \leq w \leq 1$, respectively.

A membrane-electrode assembly according to the present invention is a membrane-electrode assembly comprising an anode electrode including an anode catalyst layer, a cathode electrode including a cathode catalyst layer, and an electrolyte layer such as a proton conductive film placed between the anode electrode and cathode electrode, wherein in at least one of the anode catalyst layer and cathode catalyst layer, at least one part of the catalyst material particles containing the ferromagnetic catalyst having a composition represented by formula (2) described above are aligned in one direction.

An example of this electrode is shown in FIG. 1. FIG. 1 is a schematic view showing an example of the fuel cell electrode according to the present invention.

The fuel cell electrode includes a collector 1, and a catalyst layer 2 formed on the collector 1. In the catalyst layer 2, a catalyst material particles 3 containing ferromagnetic catalyst particles having a composition represented by formula (2) are arranged in directions (indicated by arrows in FIG. 1) parallel to the thickness direction of the catalyst layer 2. Arrangement along the thickness direction means that the catalyst material particles 3 stack in the thickness direction of the catalyst layer 2. Also, the catalyst material particles 3 are unevenly distributed toward the collector 1. Therefore, the content of the catalyst material particles 3 on a surface S of the catalyst layer 2, which opposes the collector 1, is larger than the content of the catalyst material particles 3 on the opposite surface.

In this electrode, transport of electrons and protons and supply of fuel can be smoothly performed. Therefore, the internal resistance of the catalyst layer can be lowered, so the performance of the fuel cell can be improved.

When the ratio of the catalyst material particles arranged in the specific direction as shown in FIG. 1 is 30% or more of the total amount of catalyst material particles, the electron conductivity and proton diffusibility of the electrode can be well increased.

The ferromagnetic catalyst particles having the composition represented by formula (2) have high catalyst activity and high durability. The reasons why the atomic ratios $u$, $v$, and $w$ are limited to the above-mentioned ranges will be explained below.

If the atomic ratio $u$ is less than 0.2, the ferromagnetism of the catalyst particles decreases. This makes it difficult to align the catalyst material particles. If the atomic ratio $u$ exceeds 4, the chemical stability and durability are significantly lower. A more preferred range is $1 \leq u \leq 3$. If the atomic ratio $v$ exceeds 1, the ferromagnetism of the catalyst particles decreases, which makes it difficult to align the catalyst material. If the atomic ratio $w$ exceeds 1, the catalyst activity or ferromagnetism sometimes lowers, and this makes the fuel cell output unstable in some cases. Note that 30% or more of A1 can be substituted by at least one element selected from H and O. A more preferred range of the atomic ratio $v$ is $0 \leq v \leq 0.8$.

When the catalyst activity and ferromagnetism are taken into consideration, the average diameter of the fine ferromagnetic catalyst particles is preferably 0.5 to 50 nm. If the average diameter is less than 0.5 nm, the ferromagnetism of the particles is difficult to obtain. If the average diameter exceeds 50 nm, the specific surface area of the catalyst particles decreases, so the catalyst activity lowers. A more preferred range is 1.5 to 20 nm.

The shape of the fine ferromagnetic catalyst particles having the composition represented by formula (2) presented earlier is not limited. However, in many cases, the shape is a sphere or the shape of a peanut.

Even in a catalyst layer in which ferromagnetic catalyst particles and nonferromagnetic catalyst particles are mixed, the catalyst material can be arranged by magnetic field processing. The performance of the fuel cell can be improved even when this electrode is used. To obtain a satisfactory arranging effect, the amount of ferromagnetic catalyst particles is important and favorably 30 wt % or more of the total catalyst material particles amount.

A fine catalyst particle manufacturing method can be any of an impregnation method, precipitation method, coprecipitation method, colloid method, and ion exchange method. In some cases, nitrogen can be added to fine catalyst particles by nitriding. As catalyst material particles, it is possible to use either uncarried fine catalyst particles or fine catalyst particles carried on fine conductive particles. When fine catalyst particles are carried on fine conductive particles, it is possible to suppress flocculation and sintering between the fine catalyst particles, and improve the durability of the fuel cell. Examples of the carrier are carbon-based materials such as carbon black and carbon nanofiber. However, another substance having high conductivity can also be used. When catalyst particles are carried on a carrier, the larger the catalyst carrying amount, the more advantageously the catalyst carrier is arranged. The catalyst carrying amount is preferably 15 wt % or more.

In the membrane-electrode assembly according to the present invention, when the catalyst material particles containing the ferromagnetic catalyst having the composition represented by formula (2) are to be contained in an anode electrode, this anode electrode includes an anode catalyst layer containing the catalyst material, and a collector which carries this anode catalyst layer. At least one part of the catalyst material particles stack in the thickness direction of the anode catalyst layer. In addition, the content of the catalyst material on the surface of the anode catalyst layer that opposes the collector is made larger than that of the catalyst material on the surface which opposes an electrolyte layer. In this manner, the utilization of fuel (e.g., an aqueous methanol solution) in the anode catalyst layer can be increased.

When the catalyst material particles containing the ferromagnetic catalyst particles having the composition represented by formula (2) are to be contained in a cathode electrode, this cathode electrode includes a cathode catalyst layer containing the catalyst material, and a collector which carries this cathode catalyst layer. At least one part of the catalyst material particles stack in the thickness direction of the cathode catalyst layer. In addition, the content of the catalyst material particles on that surface of the cathode catalyst layer, which opposes an electrolyte layer is made larger than that of the catalyst material particles on the surface which opposes the collector. In this manner, the methanol crossover can be decreased.

A method of manufacturing the fuel cell electrode according to the third embodiment will be described below.

This manufacturing method comprises forming an undried catalyst layer on a support by coating the support with a slurry containing ferromagnetic catalyst particles, a proton conductive material, and an organic solvent, and drying the catalyst layer under a magnetic field of 0.1 tesla or more.

An apparatus for manufacturing the fuel cell electrode according to the third embodiment is used in the fuel cell electrode manufacturing method according to the present invention, and comprises a magnetic field generating unit which includes at least one of an electromagnet and a permanent magnet.

The fuel cell electrode manufacturing method according to the present invention will be described below with reference to FIG. 2. FIG. 2 is a schematic view showing an example of the magnetic field applying step of the fuel cell electrode manufacturing method according to the present invention.

An undried catalyst layer 4 containing catalyst particles, a proton conductive material, and an organic solvent is placed on a support 5. As the support 5, it is possible to use, e.g., a collector film such as carbon paper or carbon cloth, a polymer proton conductive film, or a dummy film. The catalyst layer 4 and support 5 are arranged between a pair of magnetic poles 6a and 6b, and a magnetic field is applied along the direction (indicated by an arrow in FIG. 2) of thickness of the catalyst layer 4. In this magnetic field, the fine ferromagnetic particles are arranged along a line 7 of magnetic force. When drying is complete, therefore, the catalyst layer 4 in which the fine ferromagnetic particles and the proton conductive material on these particles are arranged along one direction is obtained. As a consequence, transport of electrons and protons and supply of fuel can be smoothly performed. Accordingly, it is possible to decrease the internal resistance of the catalyst layer and improve the performance of the fuel cell. Note that the catalyst particles can also be carried on fine conductive particles. In this case, the fine conductive particles carrying the catalyst particles are arranged along the line 7 of magnetic force. Consequently, the catalyst layer 4 in which the fine conductive particles carrying the catalyst particles and the proton conductive material on these fine conductive particles are arranged along one direction is obtained.

Referring to FIG. 2, the catalyst layer 4 is provided on the magnetic pole 6b via the support 5. Therefore, when the catalyst layer 4 is aligned by a magnetic field, the ferromagnetic catalyst particles are drawn to the nearer magnetic pole 6b, so the catalyst particles collect to the side of the catalyst layer 4 that is close to the magnetic pole 6b. Consequently, a catalyst particle distribution having a density higher than that when no magnetic field processing is performed is obtained. When this high-density side of the catalyst layer is positioned close to the fuel supply side, the catalyst can be efficiently used, so the performance of the fuel cell can be improved. Also, since the ferromagnetic catalyst particles are drawn to the nearer magnetic pole 6b, a thin catalyst layer having a high-density catalyst distribution can be formed by adjusting the viscosity of the catalyst layer 4 before it is dried. As a consequence, the catalyst activity in a unit volume can be improved, and the internal resistance of the catalyst layer can be decreased. Therefore, the output of the fuel cell can be improved.

In the present invention, a magnetic field can be generated by an electromagnet or permanent magnet, or by combination of an electromagnetic and permanent magnet. If the applied magnetic field is less than 0.1 tesla, almost no magnetic field applying effect can be observed due to the weak magnetic field. The stronger the magnetic field is, the more easily the ferromagnetic particles are arranged along the direction of the line of magnetic force. However, this may largely increase the cost of the magnetic field aligning installation. Therefore, the applied magnetic field is desirably 0.1 (inclusive) to 2 (inclusive) tesla.

If fine ferromagnetic particles having a high coercive force are used in the cathode, magnetic field will exist near these fine ferromagnetic particles, so oxygen supplied to the cathode can be improved by the oxygen concentrating effect. This may further improve the performance of the fuel cell. In this case, fine ferromagnetic particles having a coercive force of 1,000 (Oe) or more are desirable, because low coercive force of fine ferromagnetic particles leads to weak oxygen concentrating effect.

Note that FIG. 2 is explained by taking the manufacture of an electrode by the slurry method as an example. However, the present invention is similarly applicable to another electrode preparation method such as a decal method.

Examples of the present invention will be described in detail below with reference to the accompanying drawing.

Example 1

Formation of Cathode Catalyst Material

Carbon particles carrying $PtFe_{1.2}$ particles were obtained as a catalyst precursor by a coprecipitation method explained below. First, 20 g of carbon powders and 1,000 ml of water were used to form a suspension by using a homogenizer. This suspension was placed in a three-necked flask having a mechanical stirrer, reflux cooling pipe, and dropping funnel, and refluxed under stirring for 1 hr. Twenty minutes after 120 ml of an aqueous chloroplatinic acid ($H_2PtC_{16}$) (Pt=42 mg/ml) and 144 ml of an aqueous $FeCl_3$ solution (Fe=12 mg/ml) were added, a solution prepared by dissolving 20.0 g of sodium hydrogencarbonate in 600 ml of water was gradually dropped (the dropping time was about 60 min). After that, the resultant solution was refluxed for 2 hrs. The precipitate was transferred to a flask, refluxed over dilute sulfuric acid for 30 min, and filtered. The precipitate was well washed with pure water, transferred to a flask, and refluxed over pure water for 30 min. After being filtered, the precipitate was well washed with pure water. This precipitate was dried at 100° C. The dried precipitate was placed in a high-purity zirconia boat and reduced in a cylindrical oven at 200° C. for 10 hrs by supplying 3% $H_2/N_2$ gas at a flow rate of 100 ml/min. After that, the temperature was returned to room temperature to obtain a catalyst precursor. Note that when taken out after being reduced, the catalyst was cooled with dry ice and given non-combustibility by $CO_2$, thereby obtaining the catalyst precursor.

The obtained catalyst precursor particles were nitrided at 600° C. for 10 hrs by supplying a gas mixture of $NH_3$ and $H_2$, which contained 0.5 atm of $NH_3$ as a partial pressure, at a flow rate of 500 ml/min, thereby obtaining carbon particles carrying fine platinum-based catalyst particles having a composition and average diameter shown in Table 1 (to be presented later). Note that the composition was obtained by chemical analysis.

The diameters of the catalyst particles were measured by transmission electron microscope (TEM) analysis. That is, five arbitrary fields of the catalyst material were observed with a TEM, and the diameters of 20 particles were measured in each field. The average diameter was calculated by averaging the diameters of a total of 100 particles.

<Formation of Cathode Electrode>

1 g of the obtained cathode catalyst material and 2 g of pure water were well stirred. In addition, 4.5 g of a 20% Nafion solution and 10 g of 2-ethoxyethanol were added, and the resultant solution was well stirred. After that, 1 g of graphite (average grain size=3 μm) was added and dispersed by a bench ball mill, thereby forming a slurry. Water-repellent carbon paper (270 μm, manufactured by TORAY INDUSTRIES) was coated with the slurry by using a control coater, and the resultant material was air-dried to form a cathode electrode having a catalyst carrying density of 1 $mg/cm^2$.

<Formation of Anode Electrode>

1 g of an anode catalyst material in which carbon particles carry PtRu alloy particles having an average diameter shown in Table 1 and 2 g of pure water were well stirred. In addition, 4.5 g of a 20% Nafion solution and 10 g of 2-ethoxyethanol were added, and the resultant solution was well stirred. After that, the material was dispersed by a bench ball mill to form a slurry. Water-repellent carbon paper (350 μm, manufactured by TORAY INDUSTRIES) was coated with the slurry by using a control coater, and the resultant material was air-dried to form an anode electrode having a catalyst carrying density of 2.5 $mg/cm^2$.

<Formation of Membrane-Electrode Assembly>

Each of the cathode electrode and anode electrode was cut into a square piece of 3.2×3.2 cm so that the electrode area was 10 $cm^2$. Nafion 117 as a proton conductive solid polymer film was sandwiched between the cathode electrode and anode electrode. The resultant structure was bonded by thermocompression bonding at a pressure of 100 $kg/cm^2$ at 125° C. for 30 min, thereby forming a membrane-electrode assembly (MEA) having a structure shown in FIG. 3. That is, this membrane-electrode assembly (MEA) had a structure in which carbon paper as an anode electrode collector 8, an anode catalyst layer 9, the Nafion 117 as a proton conductive film 10, a cathode catalyst layer 11, and carbon paper as a cathode electrode collector 12 were stacked in this order.

This membrane-electrode assembly (MEA) and a fluid channel plate were used to form a single cell of a direct methanol polymer electrolyte fuel cell (DMFC). A 2M methanol solution as fuel was supplied to the anode electrode of this cell at a flow rate of 0.6 ml/min, and air was supplied to the cathode electrode of the cell at a flow rate of 21 ml/min. The relationship between the discharge current and voltage while the cell was held at 70° C. was measured, and the maximum energy density and the cell voltage at a current density of 20 $mA/cm^2$ were also measured. The results are shown in Table 1.

In addition, to evaluate the stability as the catalyst material, the cell voltage drop ratio was measured by continuously operating the cell at a current density of 20 $mA/cm^2$ for 1,000 hrs. The stability was regarded as high if the drop ratio was less than 2%, regarded as medium if the drop ratio was 2% to 5%, and regarded as low if the drop ratio exceeded 5%. The results are also shown in Table 1.

Example 2

A single cell of a direct methanol polymer electrolyte fuel cell (DMFC) was formed and the cell performance were evaluated following the same procedures as in Example 1, except that the amounts of the aqueous $FeCl_3$ solution (Fe=12 mg/ml) and sodium hydrogencarbonate were changed to 300 ml and 30.0 g, respectively, in the formation of a catalyst precursor, and the nitriding conditions were changed as shown in Table 1. The results are shown in Table 1.

Example 3

A single cell of a direct methanol polymer electrolyte fuel cell (DMFC) was formed and the cell performance were evaluated following the same procedures as in Example 1, except that a cathode catalyst material formed by a method explained below was used. The results are shown in Table 1.

Carbon particles carrying $PtFe_{0.5}Mo_{0.2}$ particles were obtained by a coprecipitation method explained below. First, 20 g of carbon powders and 1,000 ml of water were used to form a suspension by using a homogenizer. This suspension was placed in a three-necked flask having a mechanical stirrer, reflux cooling pipe, and dropping funnel, and refluxed under stirring for 1 hr. Twenty minutes after 120 ml of an aqueous chloroplatinic acid ($H_2PtC_{16}$) (Pt=42 mg/ml) and 60 ml of an aqueous $FeCl_3$ solution (Fe=12 mg/ml) were added, a solution prepared by dissolving 18.0 g of sodium hydrogencarbonate in 600 ml of water was gradually dropped (the dropping time was about 60 min). After that, the resultant solution was refluxed for 2 hrs. The precipitate was transferred to a flask, refluxed over dilute sulfuric acid for 30 min, and filtered. The precipitate was well washed with pure water, transferred to a flask, and refluxed over pure water for 30 min. After being filtered, the precipitate was well washed with pure water. This precipitate was dried at 100° C. The dried precipitate was placed in a high-purity zirconia boat and reduced in a cylindrical oven at 200° C. for 10 hrs by supplying 3% $H_2/N_2$ gas at a flow rate of 100 ml/min. After that, the temperature was returned to room temperature to obtain a catalyst precursor 1. Subsequently, the obtained catalyst precursor particles 1 and 1,000 ml of water were used to form a suspension by using a homogenizer. This suspension was placed in a three-necked flask having a mechanical stirrer, reflux cooling pipe, and dropping funnel. Twenty minutes after 51.6 ml of $(NH_4)_6Mo_7O_{24}$ (Mo=9.6 mg/ml) were added under stirring, a solution prepared by dissolving 0.1M hydrochloric acid in 120 ml was gradually dropped (the dropping time was about 60 min). After that, the resultant solution was refluxed for 2 hrs. The precipitate was filtered, well washed with pure water, and transferred to a flask. The precipitate was then refluxed over pure water for 30 min, filtered, and well washed with pure water. This precipitate was dried at 100° C. The dried precipitate was placed in a high-purity zirconia boat and reduced in a cylindrical oven at 800° C. for 1 hr by supplying $H_2$ gas at a flow rate of 500 ml/min. After that, the temperature was returned to room temperature to obtain a catalyst precursor 2.

The obtained catalyst precursor particles were nitrided at a temperature and for a time shown in Table 1 in a gas atmosphere at an $NH_3$ partial pressure shown in Table 1, thereby obtaining carbon particles carrying fine platinum-based catalyst particles having a composition and average diameter shown in Table 1.

Example 4

A single cell of a direct methanol polymer electrolyte fuel cell (DMFC) was formed and the cell performance was evaluated following the same procedures as in Example 1, except that a cathode catalyst material formed by a method explained below was used. The results are shown in Table 1.

Carbon particles carrying $Pt_{0.8}Ag_{0.2}Fe_{1.5}$ particles were obtained by a coprecipitation method explained below. First, 20 g of carbon powders and 1,000 ml of water were used to form a suspension by using a homogenizer. This suspension was placed in a three-necked flask having a mechanical stirrer, reflux cooling pipe, and dropping funnel, and refluxed under stirring for 1 hr. Twenty minutes after 96 ml of an aqueous chloroplatinic acid ($H_2PtC_{16}$) (Pt=42 mg/ml), 180 ml of an aqueous iron chloride solution (Fe=12 mg/ml), and 51.6 ml of $AgNO_3$ (Ag=10.8 mg/ml) were added, a solution prepared by dissolving 22.0 g of sodium hydrogencarbonate in 600 ml of water was gradually dropped (the dropping time was about 60 min). After that, the resultant solution was refluxed for 2 hrs. The precipitate was transferred to a flask, refluxed over dilute sulfuric acid for 30 min, and filtered. The precipitate was well washed with pure water, transferred to a flask, and refluxed over pure water for 30 min. After being filtered, the precipitate was well washed with pure water. This precipitate was dried at 100%. The dried precipitate was placed in a high-purity zirconia boat and reduced in a cylindrical oven at 200° C. for 10 hrs by supplying 3% $H_2/N_2$ gas at a flow rate of 100 ml/min. After that, the temperature was returned to room temperature to obtain a catalyst precursor. Note that when taken out after being reduced, the catalyst was cooled with dry ice and given non-combustibility by $CO_2$, thereby obtaining the catalyst precursor.

This catalyst precursor was nitrided at a temperature and for a time shown in Table 1 in a gas atmosphere at an $NH_3$ partial pressure shown in Table 1, thereby obtaining carbon particles carrying fine platinum-based catalyst particles having a composition and average diameter shown in Table 1.

Example 5

A single cell of a direct methanol polymer electrolyte fuel cell (DMFC) was formed and the cell performance were evaluated following the same procedures as in Example 1, except that a cathode catalyst material formed by a method explained below was used. The results are shown in Table 1.

Carbon particles carrying $PtCO_{1.3}$ particles were obtained by a coprecipitation method explained below. First, 20 g of carbon powders and 1,000 ml of water were used to form a suspension by using a homogenizer. This suspension was placed in a three-necked flask having a mechanical stirrer, reflux cooling pipe, and dropping funnel, and refluxed under stirring for 1 hr. Subsequently, 120 ml of an aqueous chloroplatinic acid ($H_2PtC_{16}$) (Pt=42 mg/ml), 150 ml of an aqueous $CoCl_2$ solution (Co=13 mg/ml), and a solution prepared by dissolving 15.0 g of sodium hydrogencarbonate in 500 ml of water were gradually dropped (the dropping time was about 60 min). After that, the resultant solution was refluxed for 2 hrs. The precipitate was transferred to a flask, refluxed over dilute sulfuric acid for 30 min, and filtered. The precipitate was well washed with pure water, transferred to a flask, and refluxed over pure water for 30 min. After being filtered, the precipitate was well washed with pure water. This precipitate was dried at 100° C. The dried precipitate was placed in a high-purity zirconia boat and reduced in a cylindrical oven at 200° C. for 10 hrs by supplying 3% $H_2/N_2$ gas at a flow rate of 100 ml/min. After that, the temperature was returned to room temperature to obtain a catalyst precursor. Note that when taken out after being reduced, the catalyst was cooled with dry ice and given non-combustibility by $CO_2$, thereby obtaining the catalyst precursor.

This catalyst precursor was nitrided at a temperature for a time shown in Table 1 in a gas atmosphere at an $NH_3$ partial pressure shown in Table 1, thereby obtaining carbon particles carrying fine platinum-based catalyst particles having a composition and average diameter shown in Table 1.

Example 6

A single cell of a direct methanol polymer electrolyte fuel cell (DMFC) was formed and the cell performance was evaluated following the same procedures as in Example 1, except that a cathode catalyst material formed by a method explained below was used. The results are shown in Table 1.

Carbon particles carrying $PtCr_{0.5}W_{0.6}$ particles were obtained by a coprecipitation method explained below. First, 20 g of carbon powders and 1,000 ml of water were used to form a suspension by using a homogenizer. This suspension was placed in a three-necked flask having a mechanical stirrer, reflux cooling pipe, and dropping funnel, and refluxed under stirring for 1 hr. Twenty minutes after 120 ml of an aqueous chloroplatinic acid ($H_2PtC_{16}$) (Pt=42 mg/ml) and 65 ml of an aqueous $CrCl_3$ solution (Cr=10.4 mg/ml) were added, a solution prepared by dissolving 15.0 g of sodium hydrogencarbonate in 500 ml of water was gradually dropped (the dropping time was about 60 min). After that, the resultant solution was refluxed for 2 hrs. The precipitate was transferred to a flask, refluxed over dilute sulfuric acid for 30 min, and filtered. The precipitate was well washed with pure water, transferred to a flask, and refluxed over pure water for 30 min. After being filtered, the precipitate was well washed with pure water. This precipitate was dried at 100%. The dried precipitate was placed in a high-purity zirconia boat and reduced in a cylindrical oven at 200% for 10 hrs by supplying 3% $H_2/N_2$ gas at a flow rate of 100 ml/min. After that, the temperature was returned to room temperature to obtain a catalyst precursor 1. Subsequently, the obtained catalyst precursor particles 1 and 1,000 ml of water were used to form a suspension by using a homogenizer. This suspension was placed in a three-necked flask having a mechanical stirrer, reflux cooling pipe, and dropping funnel. Twenty minutes after 155 ml of $Na_2WO_4$ (W=18.4 mg/ml) were added under stirring, 350 ml of 0.1M hydrochloric acid were gradually dropped (the dropping time was about 60 min). After that, the resultant solution was refluxed for 2 hrs. The precipitate was filtered, well washed with pure water, and transferred to a flask. The precipitate was then refluxed over pure water for 30 min, filtered, and well washed with pure water. This precipitate was dried at 100° C. The dried precipitate was placed in a high-purity zirconia boat and reduced in a cylindrical oven at 850° C. for 2 hrs by supplying $H_2$ gas at a flow rate of 500 ml/min. After that, the temperature was returned to room temperature to obtain a catalyst precursor 2.

The obtained catalyst precursor 2 was nitrided at a temperature and for a time shown in Table 1 in a gas atmosphere at an $NH_3$ partial pressure shown in Table 1, thereby obtaining carbon particles carrying fine platinum-based catalyst particles having a composition and average diameter shown in Table 1.

Example 7

A single cell of a direct methanol polymer electrolyte fuel cell (DMFC) was formed and the cell performance was evaluated following the same procedures as in Example 1, except that a cathode catalyst material formed by a method explained below was used. The results are shown in Table 1.

Carbon particles carrying Pt particles were obtained by a coprecipitation method explained below. First, 20 g of carbon powders and 1,000 ml of water were used to form a suspension by using a homogenizer. This suspension was placed in a three-necked flask having a mechanical stirrer, reflux cooling pipe, and dropping funnel, and refluxed under stirring for 1 hr. Twenty minutes after 120 ml of an aqueous chloroplatinic acid ($H_2PtC_{16}$) (Pt=42 mg/ml) were added, a solution prepared by dissolving 15.0 g of sodium hydrogencarbonate in 500 ml of water was gradually dropped (the dropping time was about 60 min). After that, the resultant solution was refluxed for 2 hrs. The precipitate was transferred to a flask, refluxed over dilute sulfuric acid for 30 min, and filtered. The precipitate was well washed with pure water, transferred to a flask, and refluxed over pure water for 30 min. After being filtered, the precipitate was well washed with pure water. This precipitate was dried at 100° C. The dried precipitate was placed in a high-purity zirconia boat and reduced in a cylindrical oven at 200° C. for 10 hrs by supplying 3% $H_2/N_2$ gas at a flow rate of 100 ml/min. After that, the temperature was returned to room temperature to obtain a catalyst precursor. Note that when taken out after being reduced, the catalyst was cooled with dry ice and given non-combustibility by $CO_2$, thereby obtaining the catalyst precursor.

This catalyst precursor was nitrided at a temperature and for a time shown in Table 1 in a gas atmosphere at an $NH_3$ partial pressure shown in Table 1, thereby obtaining carbon particles carrying fine platinum-based catalyst particles having a composition and average diameter shown in Table 1.

Example 8

An anode electrode was formed following the same procedures as in Example 1 except that an anode catalyst material was prepared by a method explained below.

Carbon particles carrying $Pt_{0.5}Ru_{0.5}Co$ particles were obtained by a coprecipitation method explained below. First, 20 g of carbon powders and 1,000 ml of water were used to form a suspension by using a homogenizer. This suspension was placed in a three-necked flask having a mechanical stirrer, reflux cooling pipe, and dropping funnel, and refluxed under stirring for 1 hr. Subsequently, 120 ml of an aqueous chloroplatinic acid ($H_2PtC_{16}$) (Pt=42 mg/ml), 129 ml of an aqueous $RuCl_3$ solution (Ru=20.2 mg/ml), 235 ml of an aqueous $CoCl_2$ solution (Co=13 mg/ml), and a solution prepared by dissolving 30.0 g of sodium hydrogencarbonate in 800 ml of water were gradually dropped (the dropping time was about 60 min). After that, the resultant solution was refluxed for 2 hrs. The precipitate was transferred to a flask, refluxed over dilute sulfuric acid for 30 min, and filtered. The precipitate was well washed with pure water, transferred to a flask, and refluxed over pure water for 30 min. After being filtered, the precipitate was well washed with pure water. This precipitate was dried at 100° C. The dried precipitate was placed in a high-purity zirconia boat and reduced in a cylindrical oven at 200° C. for 10 hrs by supplying 3% $H_2/N_2$ gas at a flow rate of 100 ml/min. After that, the temperature was returned to room temperature to obtain a catalyst precursor. Note that when taken out after being reduced, the catalyst was cooled with dry ice and given non-combustibility by $CO_2$, thereby obtaining the catalyst precursor.

The obtained catalyst precursor particles were nitrided at a temperature and for a time shown in Table 1 in a gas atmosphere at an $NH_3$ partial pressure shown in Table 1, thereby obtaining carbon particles carrying fine platinum-based catalyst particles having a composition and average diameter shown in Table 1 as an anode catalyst material.

A cathode electrode was then formed following the same procedures as in Example 1 except that carbon particles carrying Pt particles were used as a cathode catalyst material.

A single cell of a direct methanol polymer electrolyte fuel cell (DMFC) was formed and the cell performance was evaluated following the same procedures as in Example 1, except that the thus obtained anode electrode and cathode electrode were used. The results are shown in Table 1.

Example 9

A single cell of a direct methanol polymer electrolyte fuel cell (DMFC) was formed and the cell performance was evaluated following the same procedures as in Example 1, except that an anode catalyst material prepared by a method explained below was used. The results are shown in Table 1.

Carbon particles carrying $Pt_{0.5}Ru_{0.5}$ particles were obtained by a coprecipitation method explained below. First, 20 g of carbon powders and 1,000 ml of water were used to form a suspension by using a homogenizer. This suspension was placed in a three-necked flask having a mechanical stirrer, reflux cooling pipe, and dropping funnel, and refluxed under stirring for 1 hr. Subsequently, 120 ml of an aqueous chloroplatinic acid ($H_2PtC_{l6}$) (Pt=42 mg/ml), 129 ml of an aqueous $RuCl_3$ solution (Ru=20.2 mg/ml), and a solution prepared by dissolving 20.0 g of sodium hydrogencarbonate in 800 ml of water were gradually dropped (the dropping time was about 60 min). After that, the resultant solution was refluxed for 2 hrs. The precipitate was transferred to a flask, refluxed over dilute sulfuric acid for 30 min, and filtered. The precipitate was well washed with pure water, transferred to a flask, and refluxed over pure water for 30 min. After being filtered, the precipitate was well washed with pure water. This precipitate was dried at 100° C. The dried precipitate was placed in a high-purity zirconia boat and reduced in a cylindrical oven at 200° C. for 10 hrs by supplying 3% $H_2/N_2$ gas at a flow rate of 100 ml/min. After that, the temperature was returned to room temperature to obtain a catalyst precursor. Note that when taken out after being reduced, the catalyst was cooled with dry ice and given non-combustibility by $CO_2$, thereby obtaining the catalyst precursor.

The obtained catalyst precursor particles were nitrided at a temperature and for a time shown in Table 1 in a gas atmosphere at an $NH_3$ partial pressure shown in Table 1, thereby obtaining carbon particles carrying fine platinum-based catalyst particles having a composition and average diameter shown in Table 1.

Comparative Examples 1-4

Single cells of direct methanol polymer electrolyte fuel cells (DMFCs) were formed and the cell performance was evaluated following the same procedures as in Example 1, except that carbon powders carrying anode catalyst particles having average diameters and compositions shown in Table 1 were used as anode catalyst materials, and carbon powders carrying cathode catalyst particles having average diameters and compositions shown in Table 1 were used as cathode catalyst materials. The results are shown in Table 1.

TABLE 1

| | Anode catalyst composition (atomic ratio) | Anode catalyst average diameter (nm) | Cathode catalyst composition (atomic ratio) | Nitriding temperature (° C.)/time (Hr)/$NH_3$ partial pressure (atm) | Cathode catalyst average diameter (nm) | Maximum energy density (W/cm$^2$) | Voltage (V) at 20 mA/cm$^2$ | Stability |
|---|---|---|---|---|---|---|---|---|
| Example 1 | PtRu | 2.5 | $PtFe_{1.2}N_{0.1}$ | 600/10/0.5 | 2.5 | 99 | 0.47 | High |
| Example 2 | PtRu | 2.5 | $PtFe_{2.5}N_{0.8}$ | 500/30/0.2 | 2.5 | 96 | 0.45 | High |
| Example 3 | PtRu | 2.5 | $PtFe_{0.5}Mo_{0.2}N_{0.2}$ | 650/20/0.5 | 3.0 | 100 | 0.49 | High |
| Example 4 | PtRu | 2.5 | $Pt_{0.8}Ag_{0.2}Fe_{1.5}N_{0.1}$ | 600/20/0.5 | 2.5 | 94 | 0.44 | High |
| Example 5 | PtRu | 2.5 | $PtCo_{1.3}N_{0.1}$ | 600/30/0.5 | 3.0 | 98 | 0.46 | High |
| Example 6 | PtRu | 2.5 | $PtCr_{0.5}W_{0.6}N_{0.1}$ | 600/30/1.5 | 2.5 | 93 | 0.44 | High |
| Example 7 | PtRu | 2.5 | $PtN_{0.02}$ | 600/10/5 | 5 | 92 | 0.44 | High |
| Example 8 | $Pt_{0.5}Ru_{0.5}CoN_{0.03}$ | 2.5 | Pt | 600/20/0.2 | 2.5 | 91 | 0.42 | High |
| Example 9 | $Pt_{0.5}Ru_{0.5}N_{0.02}$ | 5.5 | Pt | 650/10/5 | 2.5 | 92 | 0.43 | High |
| Comparative Example 1 | PtRu | 2.5 | Pt | None | 2.5 | 87 | 0.40 | High |
| Comparative Example 2 | PtRu | 2.5 | $PtFe_{1.2}$ | None | 2.5 | 88 | 0.41 | Medium |
| Comparative Example 3 | PtRu | 2.5 | $PtFe_{2.5}$ | None | 2.5 | 86 | 0.39 | Low |
| Comparative Example 4 | $PtRuCo_2$ | 2.5 | Pt | None | 2.5 | 82 | 0.35 | Low |

As is apparent from Table 1, comparison of Examples 1 to 9 with Comparative Example 1 shows that higher outputs than those of the fuel cells of Comparative Examples 1 to 4 using the PtRu anode catalysts and Pt cathode catalysts were obtained by the fuel cells of Examples 1 to 9 comprising the nitrided catalysts. Also, comparison of Example 1 with Comparative Example 2, comparison of Example 2 with Comparative Example 3, and comparison of Example 8 with Comparative Example 4 reveal that the catalyst activity and chemical stability of a Pt-T-based catalyst can be improved by the addition of nitrogen. Especially for a catalyst containing a large amount the T element, such as $PtRuCO_2$ used in the fuel cell of Comparative Example 4, the addition of nitrogen by nitriding is effective to greatly improve the stability.

No nitrogen was found by chemical analysis in catalyst materials nitrided under conditions other than the nitriding conditions disclosed by the present invention, and the evaluation results of fuel cells (DMFCs) were similar to Comparative Examples 1 to 4. This indicates that the nitriding conditions disclosed by the present invention are necessary to allow a catalyst material to well contain nitrogen.

Effects similar to those obtained by the composition of the first invention were obtained by catalyst compositions other than those in the above examples. Also, a catalyst precursor can be formed by any of an impregnation method, colloid method, and ion exchange method, instead of the coprecipitation method described above.

Example 10

Formation of Cathode Electrode

Carbon particles carrying PtFe particles having an average diameter shown in Table 2 were formed by a coprecipitation method, thereby obtaining a cathode catalyst material. The PtFe particles in the obtained cathode catalyst material were ferromagnetic. The coercive force of the PtFe particles measured by VSM magnetic measurement is shown in Table 2. The diameters of the catalyst particles were measured by transmission electron microscope (TEM) analysis. That is, five arbitrary fields of the catalyst material were observed with a TEM, and the diameters of 20 particles were measured in each field. The average diameter was calculated by averaging the diameters of a total of 100 particles.

One g of the obtained cathode catalyst material and 2 g of pure water were well stirred. In addition, 4.5 g of a 20% Nafion solution and 10 g of 2-ethoxyethanol were added, and the resultant solution was well stirred. After that, the material was dispersed by a bench ball mill to form a slurry. Water-repellent carbon paper (270 μm, manufactured by TORAY INDUSTRIES) was coated with the slurry by using a control coater.

As shown in FIG. 2 described earlier, the slurry-coated carbon paper was placed between a pair of magnetic poles 6a and 6b, and the slurry was dried under a magnetic field of 1.2 tesla, thereby forming a cathode electrode having a catalyst carrying density of 1.5 mg/cm$^2$. The direction of the line of magnetic force was parallel to the thickness direction of the catalyst layer. When the obtained cathode electrode was observed with a TEM or FE-SEM, at least one part of the catalyst material particles was arranged along a direction parallel to the thickness direction of the catalyst layer, i.e., at least one part of the catalyst material particles stacked along the thickness direction of the catalyst material.

<Formation of Anode Electrode>

An anode catalyst material was obtained by forming carbon black particles carrying PtRu alloy particles having an average diameter of 2.5 nm by a coprecipitation method. One g of the obtained anode catalyst material and 2 g of pure water were well stirred. In addition, 4.5 g of a 20% Nafion solution and 10 g of 2-ethoxyethanol were added, and the resultant solution was well stirred. After that, the material was dispersed by a bench ball mill to form a slurry. Water-repellent carbon paper (350 μm, manufactured by TORAY INDUSTRIES) was coated with the slurry by using a control coater, and the resultant material was dried with air to form an anode electrode having a catalyst carrying density of 3 mg/cm$^2$.

<Formation of Membrane-Electrode Assembly>

Each of the cathode electrode and anode electrode was cut into a square piece of 3.2×3.2 cm so that the electrode area was 10 cm$^2$. Nafion 117 as a proton conductive solid polymer film was sandwiched between the cathode electrode and anode electrode. The resultant structure was bonded by thermocompression bonding at a pressure of 100 kg/cm$^2$ at 125° C. for 30 min, thereby forming a membrane-electrode assembly (MEA) having the structure shown in FIG. 1 described previously.

This membrane-electrode assembly (MEA) and a fluid channel plate were used to form a single cell of a direct methanol polymer electrolyte fuel cell (DMFC). A 2M methanol solution as fuel was supplied to the anode electrode of this cell at a flow rate of 0.6 ml/min, and air was supplied to the cathode electrode of the cell at a flow rate of 21 ml/min. The relationship between the discharge current and voltage while the cell was held at 70° C. was measured, and the maximum energy density and the cell voltage at a current density of 20 mA/cm$^2$ were also measured. The results are shown in Table 2.

Example 11

A single cell of a direct methanol polymer electrolyte fuel cell (DMFC) was manufactured and the cell performance was evaluated following the same procedures as in Example 10, except that the average diameter of PtFe particles of a cathode catalyst was changed to 2.0 nm as shown in Table 2. The results are shown in Table 2.

Examples 12-19

Single cells of direct methanol polymer electrolyte fuel cells (DMFCs) were manufactured and the cell performance was evaluated following the same procedures as in Example 10, except that the composition, average diameter, and coercive force of each cathode catalyst and the intensity of magnetic field were set as shown in Table 2. The results are shown in Table 2.

Example 20

Formation of Cathode Electrode

A cathode electrode was formed following the same procedures as in Example 10 except that carbon black particles carrying Pt particles having an average diameter of 2.5 nm were used as a cathode catalyst material.

<Formation of Anode Electrode>

An anode catalyst material was obtained by forming carbon black particles carrying $Pt_{0.7}Ru_{0.3}Co$ alloy particles having an average diameter shown in Table 2 by a coprecipitation method. The $Pt_{0.7}Ru_{0.3}Co$ particles in the obtained anode catalyst material were ferromagnetic. The coercive force of the particles was measured by VSM magnetic measurement. Table 2 shows the result of the measurement.

One g of the obtained anode catalyst material and 2 g of pure water were well stirred. In addition, 4.5 g of a 20% Nafion solution and 10 g of 2-ethoxyethanol were added, and the resultant solution was well stirred. After that, the material was dispersed by a bench ball mill to form a slurry. Water-repellent carbon paper (350 μm, manufactured by TORAY INDUSTRIES) was coated with the slurry by using a control coater.

As shown in FIG. 2 described earlier, the slurry-coated carbon paper was placed between a pair of magnetic poles 6a and 6b, and the slurry was dried under a magnetic field of 0.5 tesla, thereby forming an anode electrode having a catalyst carrying density of 3 mg/cm². The direction of the line of magnetic force was parallel to the thickness direction of the catalyst layer. When the obtained anode electrode was observed with a TEM or FE-SEM, at least one part of the catalyst material particles was arranged along a direction parallel to the thickness direction of the catalyst layer, i.e., at least one part of the catalyst material particles stacked along the thickness direction of the catalyst layer. Also, the content of the catalyst material particles on that surface of the anode catalyst layer, which opposed a collector was larger than that of the catalyst material particles on the opposite surface.

A single cell of a direct methanol polymer electrolyte fuel cell (DMFC) was formed and the cell performance was evaluated following the same procedures as in Example 10, except that the thus obtained cathode electrode and anode electrode were used. The results are shown in Table 2.

Example 21

A single cell of a direct methanol polymer electrolyte fuel cell (DMFC) was manufactured and the cell performance was evaluated following the same procedures as in Example 10, except that the composition, average diameter, and coercive force of the anode catalyst and the intensity of magnetic field were set as shown in Table 2. The results are shown in Table 2.

Comparative Example 5

A single cell of a direct methanol polymer electrolyte fuel cell (DMFC) was manufactured and the cell performance was evaluated following the same procedures as in Example 10, except that an anode electrode similar to that explained in Example 10 and a cathode electrode similar to that explained in Example 20 were used. The results are shown in Table 2.

Comparative Example 6

A single cell of a direct methanol polymer electrolyte fuel cell (DMFC) was manufactured and the cell performance was evaluated following the same procedures as in Example 10, except that the intensity of the magnetic field in the magnetic field processing was changed as shown in Table 2. The results are shown in Table 2.

Comparative Example 7

A single cell of a direct methanol polymer electrolyte fuel cell (DMFC) was manufactured and the cell performance was evaluated following the same procedures as in Example 20, except that the intensity of the magnetic field in the magnetic field processing was changed as shown in Table 2. The results are shown in Table 2.

TABLE 2

| | Anode catalyst composition (atomic ratio) | Cathode catalyst composition (atomic ratio) | Fine ferromagnetic particle coercive force (kOe) | Fine ferromagnetic particle average diameter (nm) | Intensity of magnetic field (tesla) | Voltage (V) at 20 mA/cm² | Maximum energy density (W/cm²) |
|---|---|---|---|---|---|---|---|
| Example 10 | PtRu | PtFe | 5.0 | 4.5 | 1.2 | 0.55 | 120 |
| Example 11 | PtRu | PtFe | 0.8 | 2.0 | 1.2 | 0.53 | 105 |
| Example 12 | PtRu | PtFe$N_{0.2}$ | 4.5 | 4.0 | 1.0 | 0.58 | 130 |
| Example 13 | PtRu | PtFe$_3$N | 0.9 | 2.5 | 1.0 | 0.52 | 110 |
| Example 14 | PtRu | PtCo | 0.3 | 2.0 | 1.0 | 0.54 | 108 |
| Example 15 | PtRu | Pt$_{0.7}$Ag$_{0.3}$Co | 0.1 | 2.5 | 0.5 | 0.50 | 105 |
| Example 16 | PtRu | PtCo$_{1.2}$Sn$_{0.3}$ | 0.5 | 3.0 | 0.5 | 0.50 | 107 |
| Example 17 | PtRu | PtFeCr$_{0.2}$ | 4.5 | 4.0 | 1.2 | 0.54 | 124 |
| Example 18 | PtRu | PtCo$_{1.1}$W$_{0.1}$ | 0.1 | 3.0 | 0.5 | 0.53 | 115 |
| Example 19 | PtRu | PtFe$_{0.5}$Co$_{0.4}$ | 0.3 | 2.0 | 0.5 | 0.55 | 110 |
| Example 20 | Pt$_{0.7}$Ru$_{0.3}$Co | Pt | 0.2 | 3.0 | 0.5 | 0.50 | 105 |
| Example 21 | Pt$_{0.8}$Ru$_{0.2}$FeN$_{0.1}$ | Pt | 0.3 | 2.5 | 0.5 | 0.47 | 105 |
| Comparative Example 5 | PtRu | Pt | None | 2.5 | None | 0.44 | 95 |
| Comparative Example 6 | PtRu | PtFe | 5.0 | 4.5 | 0.05 | 0.45 | 95 |
| Comparative Example 7 | Pt$_{0.7}$Ru$_{0.3}$Co | Pt | 0.2 | 3.0 | 0.05 | 0.43 | 90 |

As can be seen from Table 2, higher output performance than that of Comparative Example 5 using no fine ferromagnetic particles were obtained from the fuel cells of Examples 10 to 21 comprising the electrodes formed by applying magnetic field treatment to the catalyst layers containing the fine ferromagnetic particles. Also, comparison of Example 10 with Comparative Example 6 using the same catalyst compositions and comparison of Example 20 with Comparative Example 7 also using the same catalyst compositions reveal that no satisfactory effect was achieved by applied magnetic field of less than 0.1 tesla. Comparison of Examples 10 and 11 shows that a higher output was obtained by a higher coercive force. This is probably because the performance of the fuel cell improved by the oxygen concentrating effect. In addition, comparison of Examples 10 to 12 indicates that higher output performance than those of the fuel cells of Examples 10 and 11 comprising the ferromagnetic catalyst particles containing no nitrogen atoms were obtained by the fuel cell of Example 12 comprising the ferromagnetic catalyst particles containing nitrogen atoms. The above results demonstrate the fuel cell output increasing effect by the catalyst layer structure of the present invention.

As has been described in detail above, the present invention can provide a highly active and highly stable fuel cell catalyst materiel and a method of manufacturing this fuel cell catalyst material. The present invention can also provide a high-output fuel cell electrode and a method of manufacturing this fuel cell electrode. The present invention can further provide a membrane-electrode assembly and fuel cell having high output performance.

Additional advantages and modifications will readily occur to those skilled in the art. Therefore, the invention in its broader aspects is not limited to the specific details and representative embodiments shown and described herein. Accordingly, various modifications may be made without departing from the spirit and scope of the general inventive concept as defined by the appended claims and their equivalents.

What is claimed is:

1. A fuel cell catalyst material, containing platinum-containing nitride particles as catalyst particles having a composition substantially represented by $$AT_xN_u \qquad (1)$$

wherein A contains Pt or Pt and at least one noble metal element selected from the group consisting of Ru, Pd, Au and Ag, T contains at least one element selected from the group consisting of Fe, Co, Ni, Sn, Mn, Cr, V, Ti, Mo, Nb, Zr, W, Ta and Hf, N is nitrogen, atomic ratios x and u fall within ranges $0 \leq x \leq 4$ and $0.005 \leq u \leq 1$ respectively, an average diameter of the catalyst particles is 0.5 nm to 50 nm.

2. A membrane electrode assembly comprising an anode electrode including an anode catalyst layer, a cathode electrode including a cathode catalyst layer, and an electrolyte layer provided between the anode electrode and cathode electrode, wherein at least one of the anode and cathode catalyst layers contains platinum-containing nitride particles as catalyst particles substantially represented by $$AT_xN_u \qquad (1)$$

wherein A contains Pt or Pt and at least one noble metal element selected from the group consisting of Ru, Pd, Au and Ag, T contains at least one element selected from the group consisting of Fe, Co, Ni, Sn, Mn, Cr, V, Ti, Mo, Nb, Zr, W, Ta and Hf, N is nitrogen, atomic ratios x and u fall within ranges $0 \leq x \leq 4$ and $0.005 \leq u \leq 1$, respectively, an average diameter of the catalyst particles is 0.5 nm to 50 nm.

3. A fuel cell comprising an anode electrode including an anode electrode collector and an anode catalyst layer supported by the anode electrode collector, a cathode electrode including a cathode electrode collector facing the anode electrode collector with the anode catalyst layer interposed therebetween and a cathode catalyst layer supported by the cathode electrode collector and interposed between the anode electrode and the cathode electrode collector, and an electrolyte layer provided between the anode electrode and cathode electrode, wherein at least one of the anode and cathode catalyst layers contains platinum-containing nitride particles as catalyst particles substantially represented by $$AT_xN_u \qquad (1)$$

wherein A contains Pt or Pt and at least one noble metal element selected from the group consisting of Ru, Pd, Au and Ag, T contains at least one element selected from the group consisting of Fe, Co, Ni, Sn, Mn, Cr, V, Ti, Mo, Nb, Zr, W, Ta and Hf, N is nitrogen, and atomic ratios x and u fall within ranges $0 \leq x \leq 4$ and $0.005 \leq u \leq 1$, respectively, an average diameter of the catalyst particles is 0.5 nm to 50 nm.

* * * * *